US012296494B2

(12) United States Patent
Donahoe et al.

(10) Patent No.: US 12,296,494 B2
(45) Date of Patent: May 13, 2025

(54) SELF-DEFENSE DEVICE

(71) Applicant: Sleeping Tiger, Ltd., Mundelein, IL (US)

(72) Inventors: Deborah A. Donahoe, Mundelein, IL (US); David E. Machamer, Wauconda, IL (US)

(73) Assignee: SLEEPING TIGER, LTD., Mundelein, IL (US)

( * ) Notice: Subject to any disclaimer, the term of this patent is extended or adjusted under 35 U.S.C. 154(b) by 211 days.

(21) Appl. No.: 18/055,120

(22) Filed: Nov. 14, 2022

(65) Prior Publication Data

US 2024/0157586 A1 May 16, 2024

(51) Int. Cl.
*B26B 1/04* (2006.01)

(52) U.S. Cl.
CPC .................................... *B26B 1/042* (2013.01)

(58) Field of Classification Search
CPC ........ B26B 1/042; B26B 27/00; B26B 27/007
USPC .......................................................... 30/298
See application file for complete search history.

(56) References Cited

U.S. PATENT DOCUMENTS 1,858,170 A * 5/1932 Poole .................... B26B 27/007 30/291
3,648,371 A 3/1972 Petrosky
3,888,006 A * 6/1975 Roberts ................. B26B 27/007 30/291
4,034,982 A 7/1977 Rupprecht
5,038,479 A * 8/1991 Davis .................... B26B 27/007 30/232
5,325,596 A 7/1994 Baker
5,454,380 A * 10/1995 Gates ............... A41D 19/01588 128/845
5,724,739 A 3/1998 Hutton
D481,287 S 10/2003 Crist
8,353,109 B2 * 1/2013 Rohrbach ............... B26B 5/003 30/162
RE45,801 E 11/2015 Krudo
9,179,726 B2 11/2015 Hanover
9,446,528 B1 * 9/2016 Zahorski ............... B26B 27/007
9,908,246 B2 * 3/2018 Frauenglass .............. B26B 1/10
D839,709 S * 2/2019 Halvorson ....................... D8/99
10,238,188 B2 * 3/2019 Kim ......................... A44C 5/00

(Continued)

FOREIGN PATENT DOCUMENTS

CA 3065733 6/2021
CN 205281124 6/2016

(Continued)

OTHER PUBLICATIONS

TigerLady, Self-Defense Claw, retrieved from https://www.tigerlady.com/ on Dec. 1, 2022, 4 pp.

(Continued)

*Primary Examiner* — Adam J Eiseman
*Assistant Examiner* — Richard D Crosby, Jr.
(74) *Attorney, Agent, or Firm* — Nixon Peabody LLP

(57) ABSTRACT

A self-defense device including a wrist-wearable wearable holder and knife detachably coupled to the wearable holder. The knife includes a handle, body, arm and blade, wherein the handle is coupled to the body and the arm is coupled to the body and blade. The handle, arm and blade are each configured to move relative to the body between retracted and extended positions. The body preferably has a substantially round perimeter and the blade has a substantially curved outer edge matching the curve of the body's perimeter. The handle, arm and blade each substantially retract into the body's round perimeter when in their retracted positions.

20 Claims, 19 Drawing Sheets

(56) References Cited

U.S. PATENT DOCUMENTS

| | | | | |
|---|---|---|---|---|
| 10,330,431 | B1 | 6/2019 | West | |
| 10,737,400 | B2 | 8/2020 | Caswell | |
| 10,870,213 | B2 * | 12/2020 | Hogg | B26B 1/08 |
| 11,565,432 | B2 * | 1/2023 | Rohrbach | B26B 5/001 |
| 2010/0236077 | A1 | 9/2010 | Shirey | |
| 2010/0251552 | A1 * | 10/2010 | Gazcon | B26B 1/08 30/162 |
| 2016/0311123 | A1 * | 10/2016 | Schoon | B26B 27/007 |
| 2017/0015011 | A1 | 1/2017 | Stroh | |
| 2017/0334084 | A1 * | 11/2017 | Hogg | B26B 1/08 |
| 2018/0154531 | A1 * | 6/2018 | Caswell | B26B 1/10 |
| 2020/0047357 | A1 * | 2/2020 | Caswell | B26B 1/042 |

FOREIGN PATENT DOCUMENTS

| | | |
|---|---|---|
| CN | 106773599 | 5/2017 |
| RU | 2005106032 | 8/2006 |

OTHER PUBLICATIONS

Horizon Knives, Eclipse: The Morphing Coin Shaped Everyday Carry Knife, retrieved from <https://www.kickstarter.com/projects/horizonknives/eclipse-the-morphing-coin-shaped-everyday-carry-kn> on Nov. 14, 2022, 32 pp., Last updated Feb. 19, 2020.

Yanko Design, This Titanium EDC Folding Knife Has A Uniquely Cyberpunk Aesthetic That We Just Can't Ignore, retrieved from <https://www.yankodesign.com/2022/05/13/this-titanium-edc-folding-knife-has-a-uniquely-cyberpunk-aesthetic-that-we-just-cant-ignore> on Nov. 14, 2022, 8 pp., May 13, 2022.

Lavars, Tiny Lyra knife uses clever folding linkage to stretch out for a four-finger grip, New Atlas, May 24, 2019, retrieved from <https://newatlas.com/lyra-knife-folding-linkage/59836/> on Nov. 14, 2022, 13 pp.

* cited by examiner

SELF-DEFENSE DEVICE

TECHNICAL FIELD

The present disclosure relates generally to self-defense devices and, more particularly, to a wearable self-defense device featuring a collapsible handle and blade.

BACKGROUND

In an attack situation, a victim lacking other options will often resort to clawing with their fingernails—particularly when the attacker approaches from behind and places their arm(s) across or around the victim's neck, chest or waist. While a victim's use of fingernails shows a determined willingness to fight back and ability to make contact at close range, it often results in broken and deeply torn fingernails with little damage to the attacker. Thus, a victim can benefit by possessing a tool or weapon that can be employed using an instinctive pulling/clawing action (similar to the use of fingernails), but capable of inflicting damage more likely to repel an attack.

Numerous self-defense devices exist, but many fall short in panic situations involving minimal distance from the attacker or little time to react. Many conventional devices, such as Tasers or pepper spray devices, must be aimed and require sufficient distance from the attacker. Further, such devices are often rendered ineffective when the victim is restrained from behind. Other conventional devices, such as tactical pens, telescoping batons and keychain pressure devices require skill or strength, thereby limiting their usefulness.

While self-defense blades or knifes are available, most such devices are not designed to take advantage of the instinctive clawing or pulling motion described above. Further, such devices could be dropped or turned against a user under duress. Further, users may be unable to access conventional devices quickly enough if carried in a pocket or purse.

Thus, the need exists for a wearable self-defense apparatus providing a high state of readiness for sudden close contact attack that is instinctively simple to deploy and use, safe for the user, safe-guarded against dropping or being used by the attacker, and compact with a pleasing form-factor.

SUMMARY

In accordance with exemplary embodiments, the self-defense device includes a knife comprising a handle, body, arm and blade, wherein the handle is coupled to the body and the arm is coupled to the body and blade.

In one aspect, the self-defense device is highly accessible for immediate deployment under duress. Its fit relative to the user's hand should be conducive to simple pulling without requiring significant strength or complex flexing or articulation of the wrist. The device should also be difficult for the attacker to seize and turn against the victim.

In another aspect, the device's blade is shaped for aggressive penetration when drawn with a pulling (clawing) action. A hook shaped blade emulating a cat's claw would provide the aggressive penetration and cutting damage desired for a defensive pulling motion.

In another aspect, the device provides accessibility by being wearable on the user's wrist near the palm of the hand and readily transferred to the hand for use.

In another aspect, the device is compact and visually unobtrusive to make its wearing tolerable and desirable.

In another aspect, transferring the device from the wrist to the hand can be simple and quick to execute. A trigger release and spring propulsion could be employed for this purpose. A spring extendable handle, which can lengthen during transfer to the hand, increases the graspable length, as could an extendible arm linkage. In its retracted position, the handle could act as a safety, preventing the blade from inadvertently deploying.

In another aspect, the blade can be quickly and safely deployed for use against the attacker. A further, highly accessible trigger and spring-loaded arm linkage can open the blade into a ready position and orientation.

In another aspect, the device can remain attached to the wrist by a strong, flexible tether to protect against seizure by the attacker or fumbling by the user. The tether can also aid the user's grip during the pulling action associated with use.

DETAILED DESCRIPTION

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
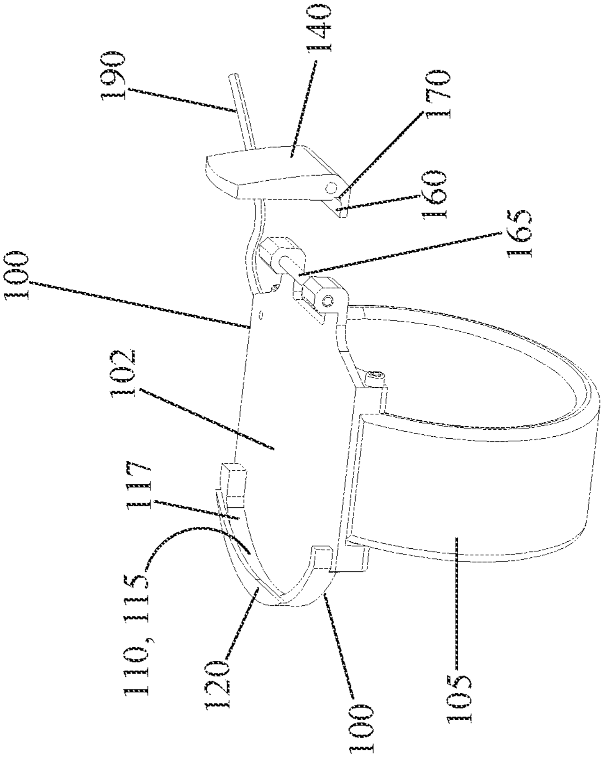
FIG. 1 shows a perspective view of an embodiment of a holder.

In accordance with an embodiment, FIG. 1 shows a wearable holder 100 and wristband 105. The wristband 105 may be constructed using leather, canvas, nylon, metal, rubber or other material available for use in watch straps or fitness-related wrist straps or wristbands. The wristband 105 engages the holder 100 using screws, pins or other modes of attachment common to watch straps. Similarly, the wristband 105 may be secured around the wrist using a clasp or Velcro interface in a manner common to watch straps or fitness-related straps or wristbands.

As shown most clearly in FIG. 1, the holder 100 includes a holder base 102 and pocket 110 defined by a pocket channel 115, launch shoulder 120 and launch wall 117. A trigger 140 pivots relative to the holder base 102 using a trigger pin 165. The trigger 140 includes a ledge 160 and trigger groove 170. The trigger 140 pivots between an engaged position shown in FIGS. 1 and 8, and disengaged position in a manner described further below. A tether 190, made of nylon, paracord, wire or other flexible/durable material is fastened to the holder 100 at one end and an anchor 260 or the like fixed to the knife 200 at the other end.

Figure 2:
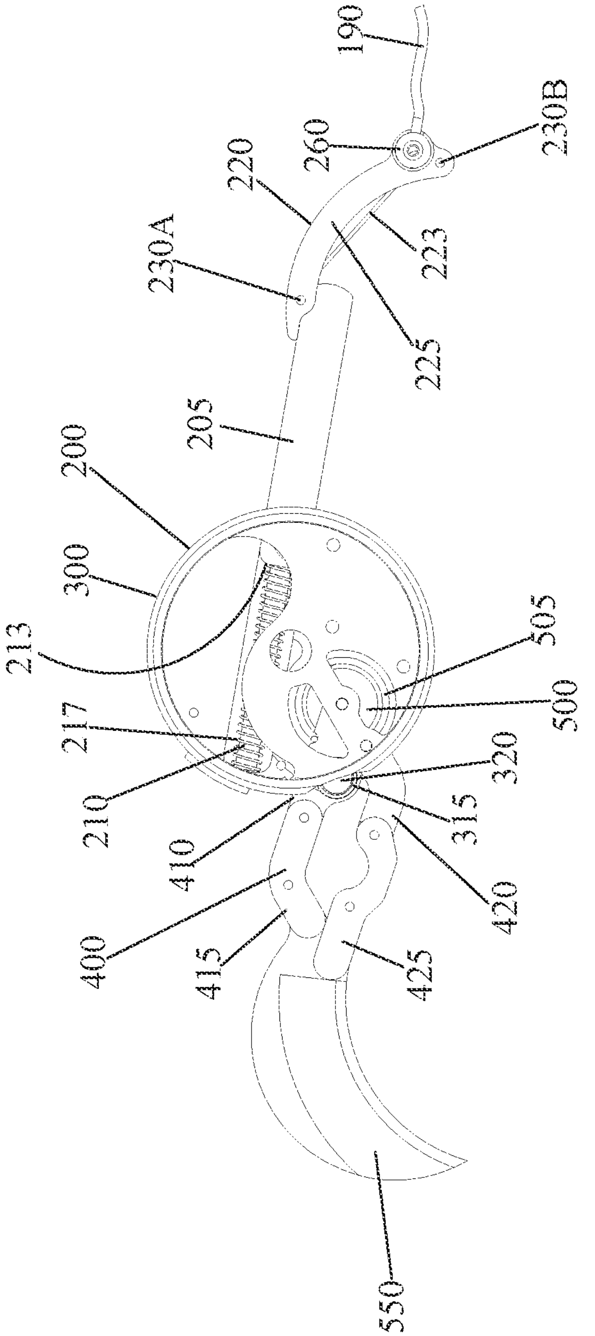
FIG. 2 shows a top view of an embodiment of a knife in its extended position with the trigger plate removed.
Figure 3:
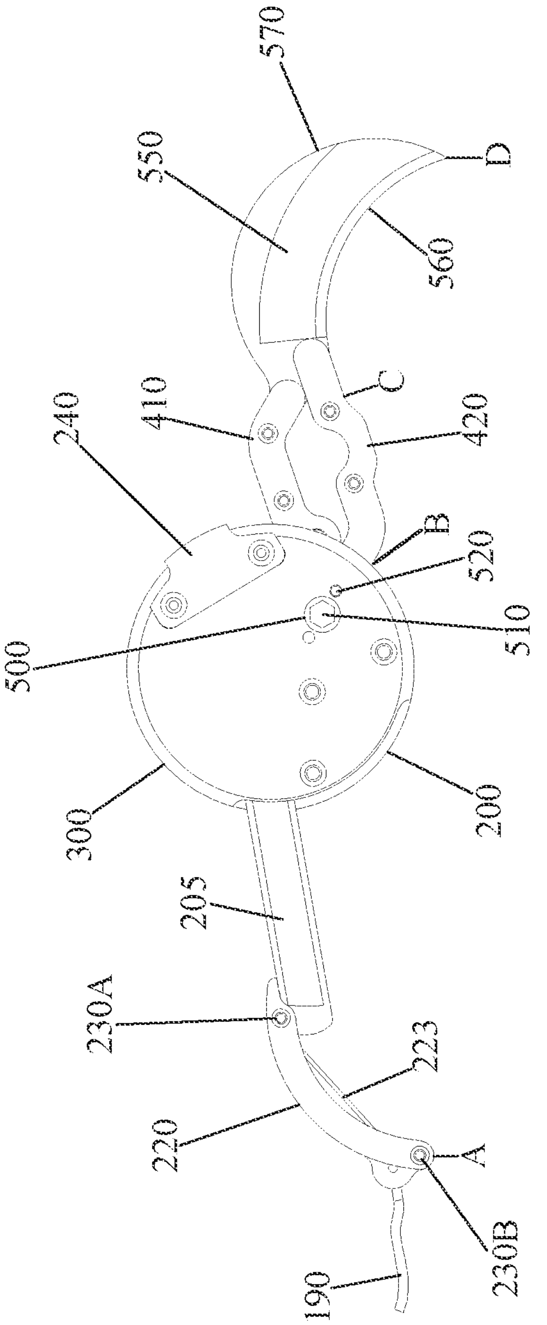
FIG. 3 shows a bottom view of the embodiment of FIG. 2.
Figure 4:
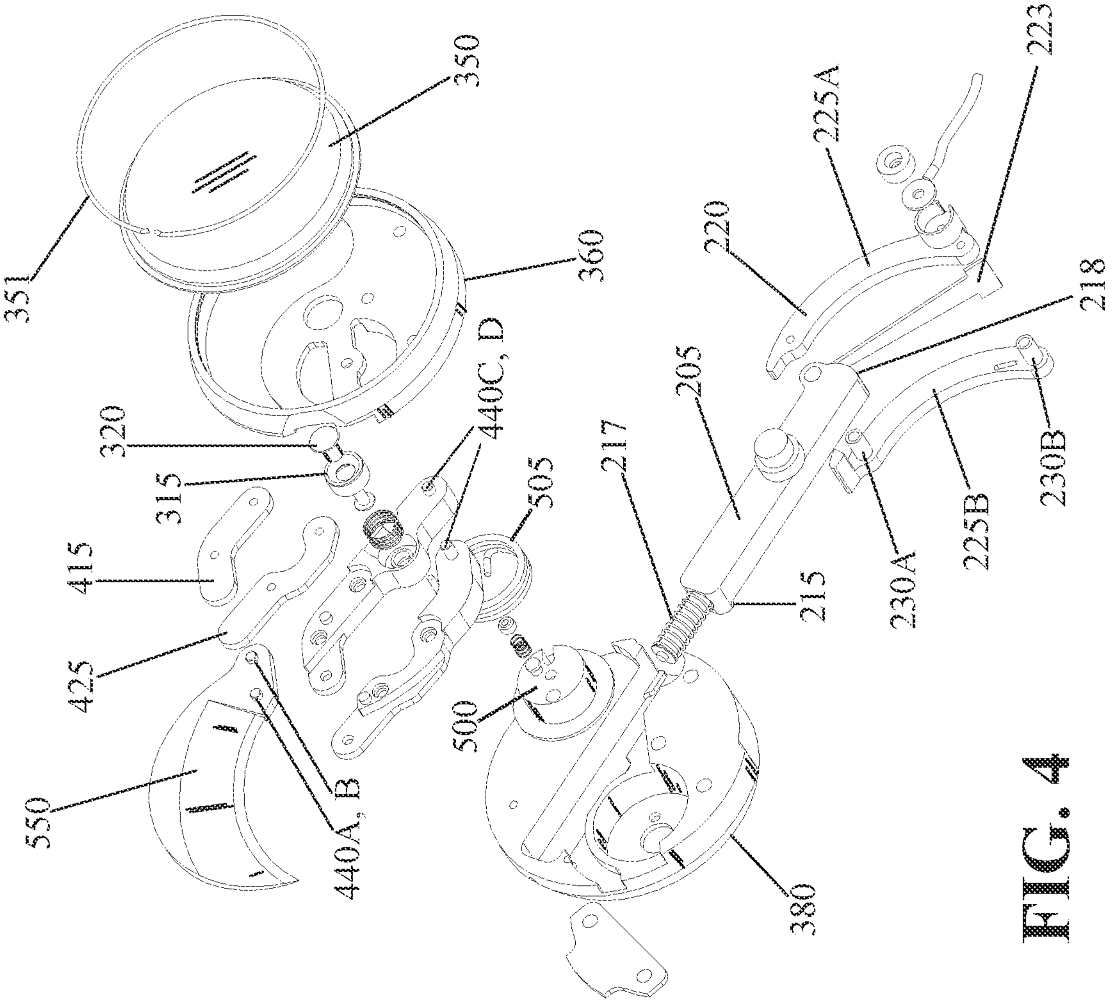
FIG. 4 shows an exploded view of the embodiment of FIG. 2.

As shown in FIGS. 2-4, the knife 200 includes a foot 220, handle 205, body 300, arm 400 and blade 550. The foot 220 resembles a clevis with opposing wings 225A, 225B connected by foot pins 230A, 230B at proximate and distal ends. A foot spring 223, which may be in the form of a leaf spring, torsion spring or other resilient member, is preferably anchored near foot pin 230B. The proximate end of the foot 220 is pivotably coupled to a distal end of the handle 205 using foot pin 230A. This arrangement enables the foot 220 to pivot relative to the handle 205 between a retracted position (shown, for example, in FIG. 9) and extended position (shown in FIGS. 2-3). At the proximate end of the foot, one end of the foot spring 223 engages a surface of the handle 205 to bias the foot 220 toward the extended position.

Figure 8:
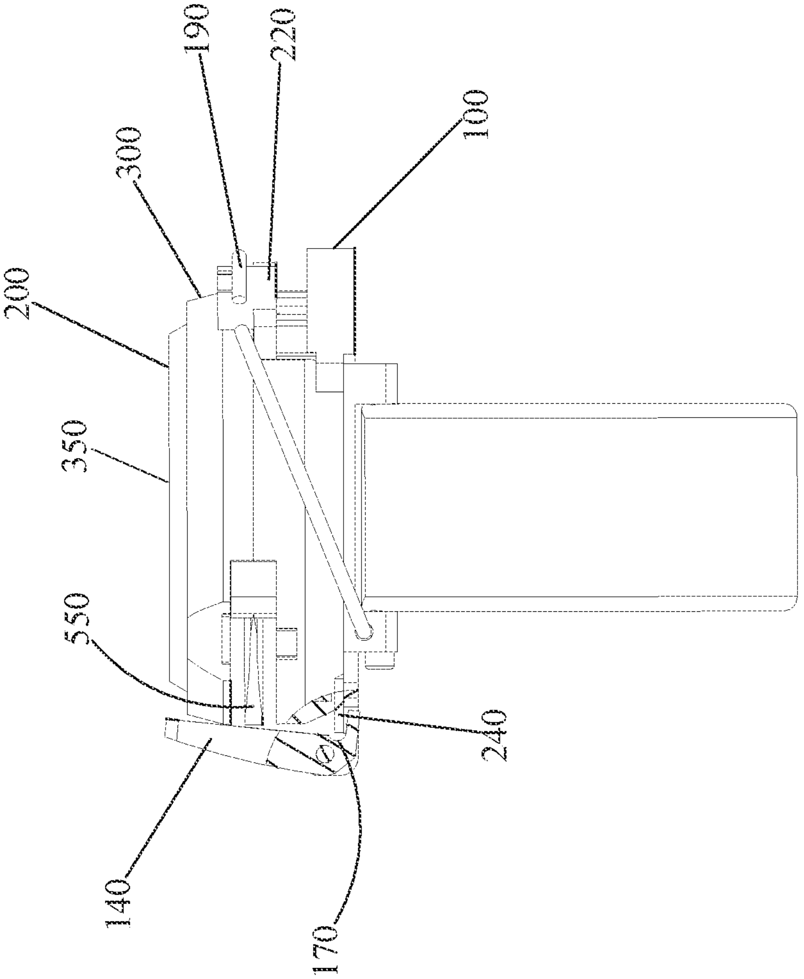
FIG. 8 shows a side view of the embodiment of FIG. 7A.
Figure 9:
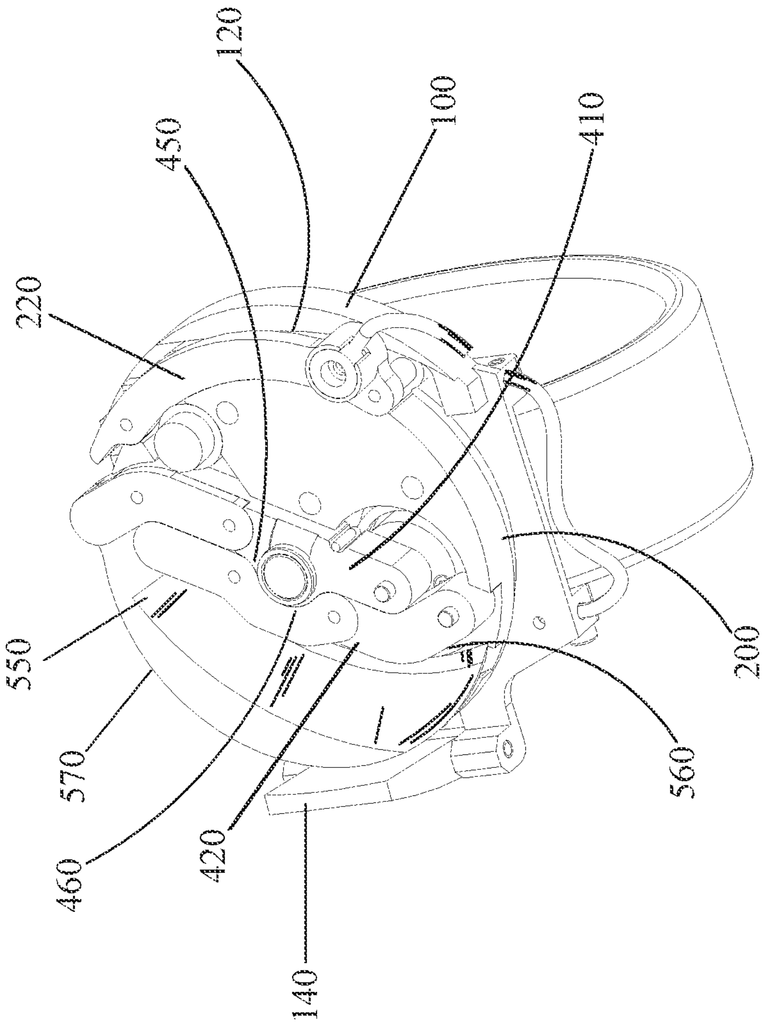
FIG. 9 shows a perspective view of the embodiment of FIG. 7A with the trigger plate removed.

As shown in FIGS. 8-9, the foot 220 can be formed with a curve that substantially matches the curve of the body 300, such that when the foot is folded into its retracted position with the knife 200 seated, at least a portion of the foot substantially matches the circular perimeter of the body 300.

Figure 7A:
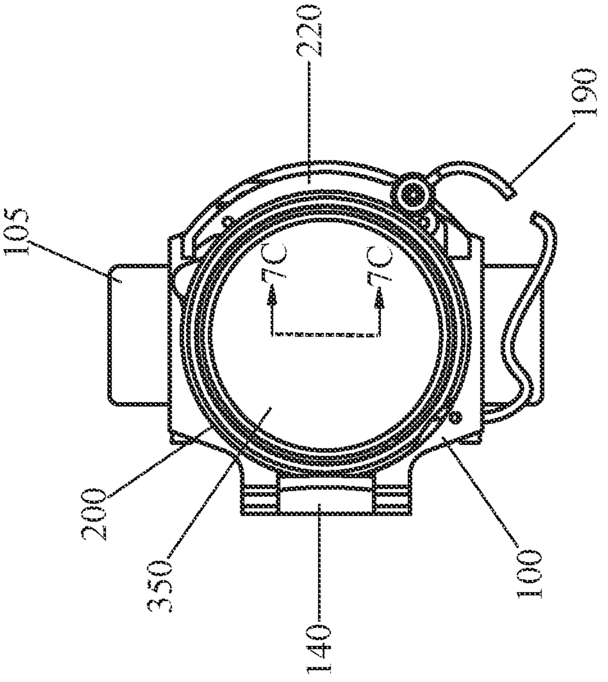
FIG. 7A shows a top view of the knife embodiment of FIG. 2 when seated on the holder embodiment of FIG. 1 with the trigger plate present.
Figure 7B:
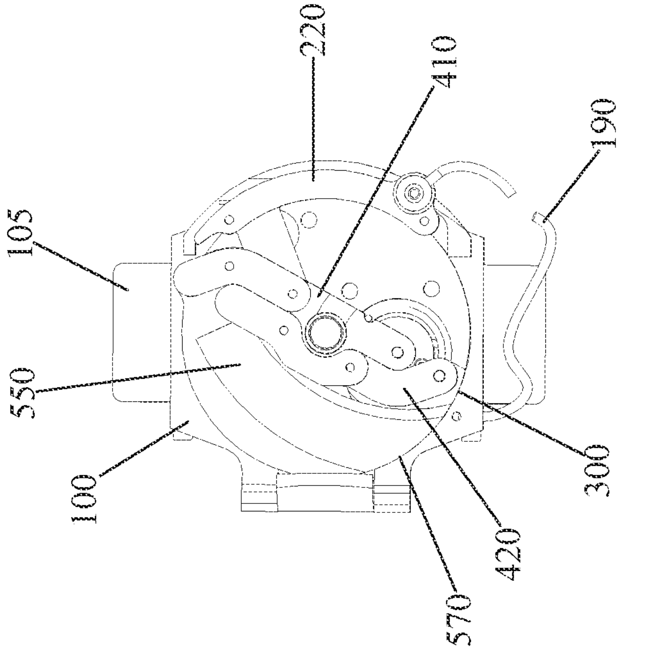
FIG. 7B shows a top view of the knife embodiment of FIG. 2 when seated on the holder embodiment of FIG. 1 with the trigger plate removed.

The handle 205 is slideably received into a handle channel 370 formed by opposing upper and lower body plates 360, 380. The inner walls of the handle 205 form a handle cavity 213 that houses a handle spring 217 (or other resilient member) arranged around a spring guide pin 210 in a manner that biases the handle 205 from a retracted position (shown in FIGS. 7-9) toward an extended position (shown in FIGS. 2-4). As the handle 205 travels toward the extended position, a protrusion 215 or the like, formed near the end of the handle's outer wall engages a surface of the body 300 to prevent the handle from fully disengaging from the body 300.

The body 300, substantially formed by the upper and lower body plates 360, 380 may have a round form (disk-shaped or circular-shaped) in a manner that resembles a wristwatch. A trigger plate 350 sits within the perimeter of a circular wall formed at the top surface of the upper body plate 360. The trigger plate 350 is retained at its perimeter by a circular retaining ring 351. In one embodiment the trigger plate 350 is a single layer disk made of metal or glass (resembling a wristwatch crystal), for example. In other exemplary embodiments, the trigger plate 350 may comprise a multi-layer assembly that houses a functioning digital or mechanical watch dial or one of many other wearable electrical devices having a digital display and a sufficiently flat form factor. Under such embodiments, the body 300 and wristband 105 can function as, and resemble, a wristwatch or other wearable device when the body is in the engaged position.

As shown most clearly in FIGS. 6A-6C and 7C, the knife may include a release button 310 comprising a cap 320 and collar 315 having a taper 317 where the collar 315 is adapted to slideably receive the cap 320. An upper bore 430 formed within the upper link 410 of the arm 400 (discussed further below) slideably receives the release button 310, such that the release button 310 travels in an axial direction relative to the upper link 410 between raised and lowered positions. As shown most clearly in FIG. 6B, a button spring 325 (in the form of a coil spring or other resilient member) rests between outer and inner portions of the upper bore 430 formed on the upper link 410, and presses on the undersurface of the collar 315 in a manner that biases the release button 310 toward the raised position (i.e. toward trigger plate 350).

Figure 7C:
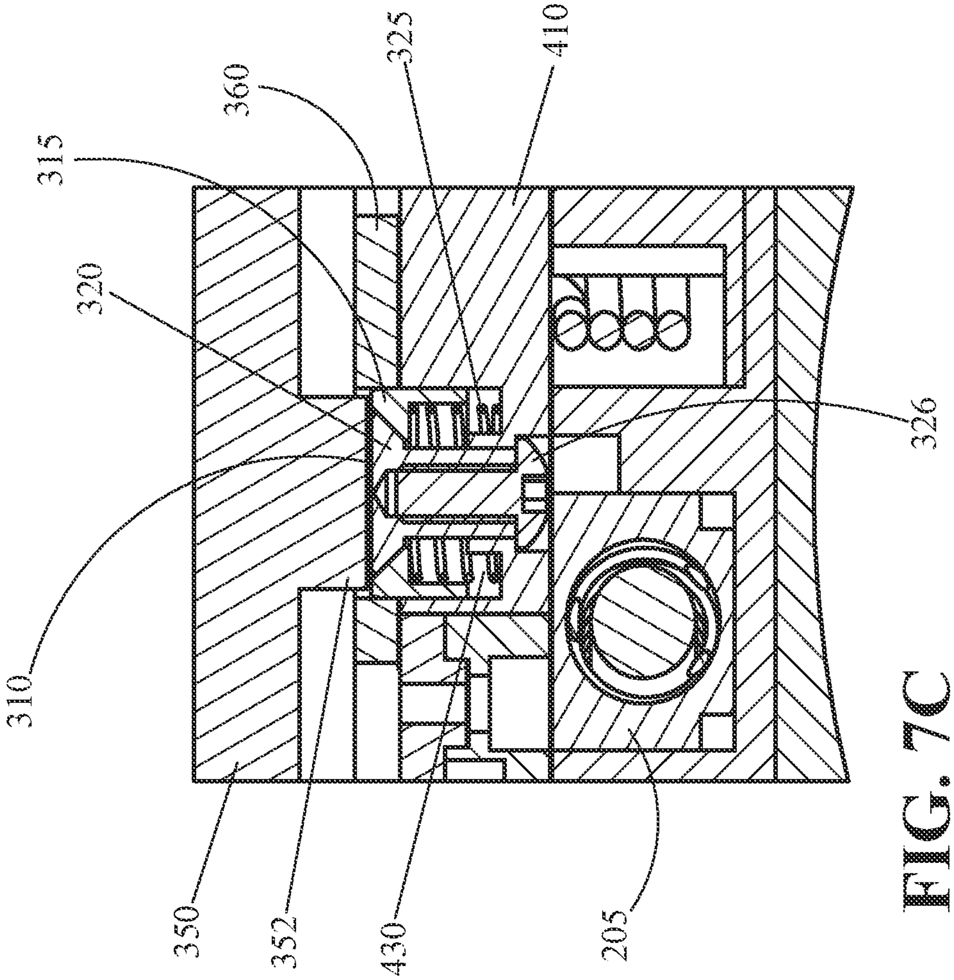
FIG. 7C is a partial cross-sectional view taken along line 7C—7C shown in FIG. 7A.

As shown most clearly in FIG. 7C, a boss 352 formed on the undersurface of the trigger plate 350 communicates through an aperture in the upper body plate 360 to make contact with the cap 320 and to urge the release button 310 toward its lowered position when the trigger plate 350 is pressed. A button head screw 326 or the like holds components of the release button 310 together and maintains them in the upper bore 430.

Figure 5:
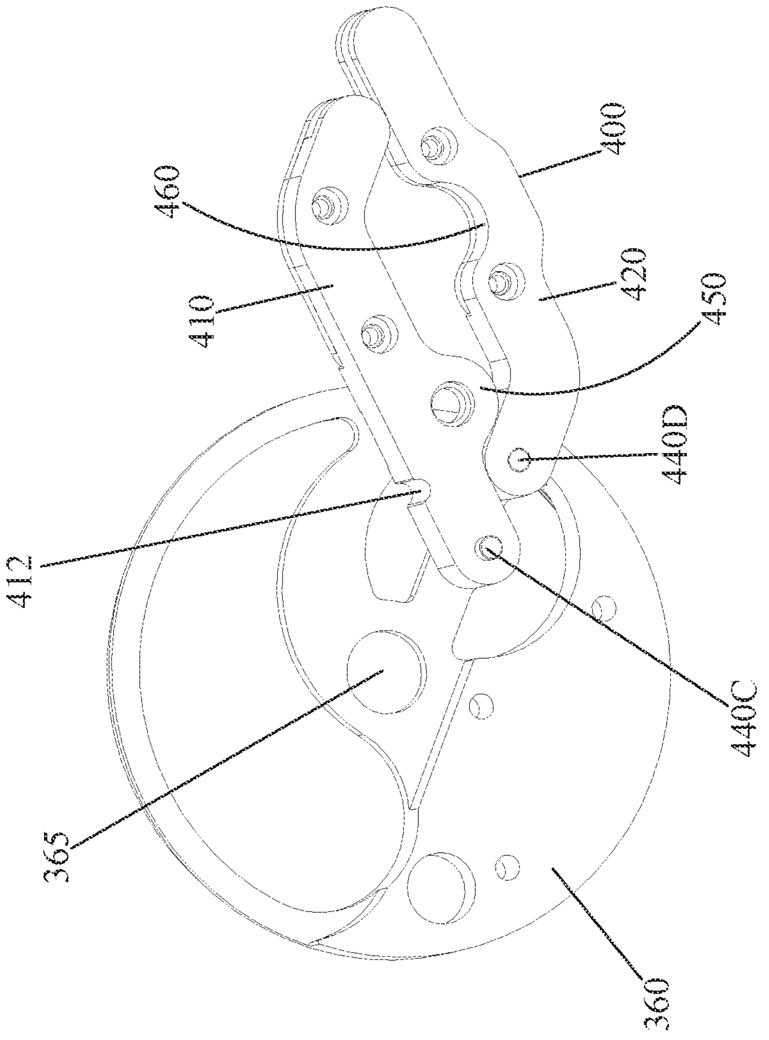
FIG. 5 shows an enlarged bottom view of the arm and upper body plate with other items removed.

As shown most clearly in FIGS. 4-5, an arm assembly 400 operates as a 4-bar linkage comprising an upper link 410, lower link 420 and four linkage pivot elements 440A-D representing the four corners of the 4-bar linkage. Pivot elements 440A-D may be formed from protrusions or pins extending from the upper link 410, lower link 420 and blade 550. Opposing apertures engage pivot elements 440A-D to effectuate pivoting movement. Pivot elements 440A, B are spaced apart at a proximate end of the blade 550 and pivot elements 440C, D are similarly spaced apart in positions relative to the body 300 to form opposing linkage elements on the body 300 and blade 550 and to connect the upper and lower linkages. Under this arrangement, the arm's 4-bar linkage is permitted to pivot between extended and retracted positions shown, respectively, in FIGS. 6A and 9. A drum assembly 500, equipped with a torsion drum spring 505 (or other resilient member), acts to bias the arm toward its extended position.

Figure 10:
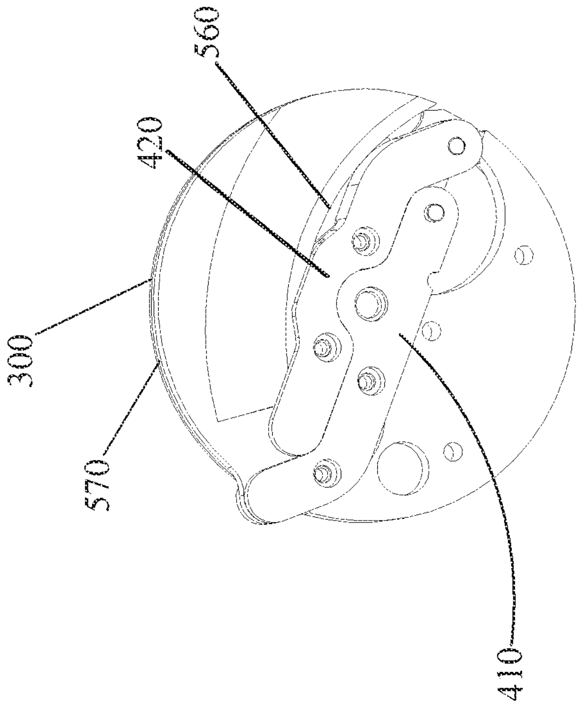
FIG. 10 shows the items of FIG. 5 with the blade included and arm and blade in their retracted positions.

FIGS. 5 and 10 show opposing interlocking shapes (such as protrusion 450 and cutout 460) formed in the upper 410 and lower 420 linkages, thereby allowing the linkages to collapse into each other in their retracted positions.

Figure 6A:
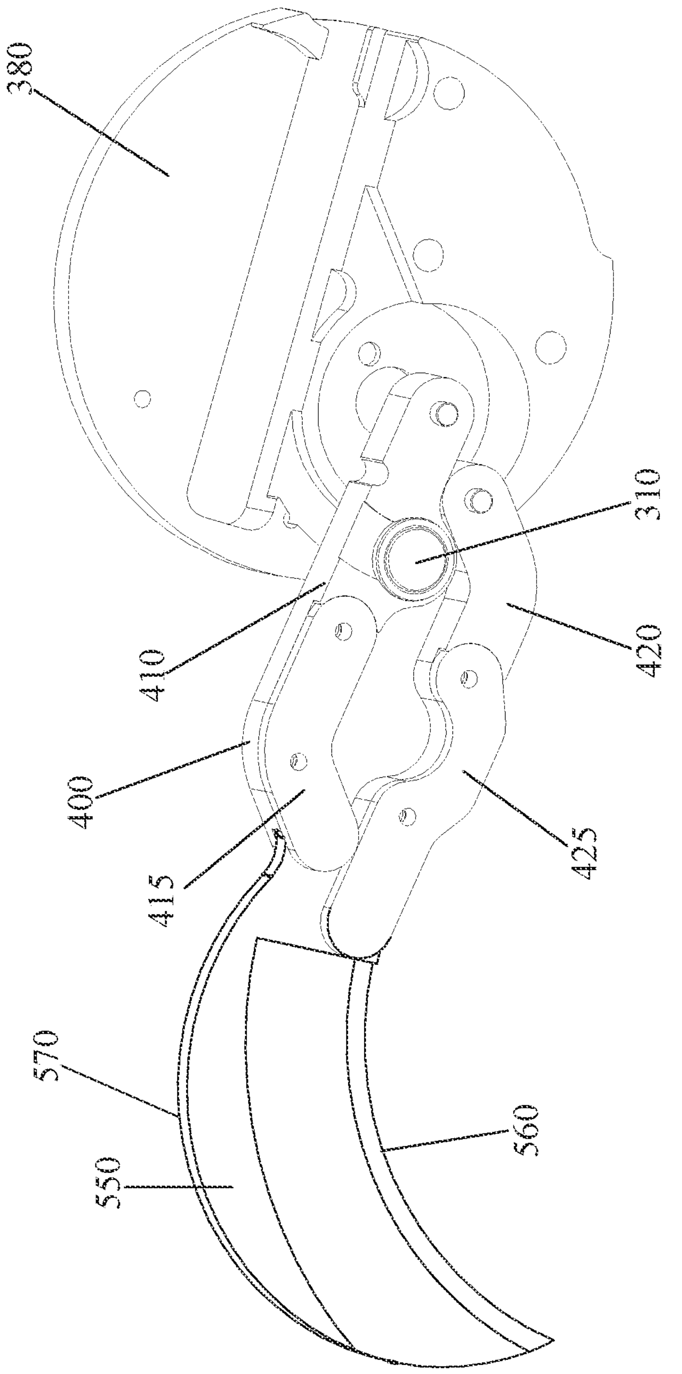
FIG. 6A shows an enlarged perspective view of the release button, arm and lower body plate with other items removed.
Figure 6B:
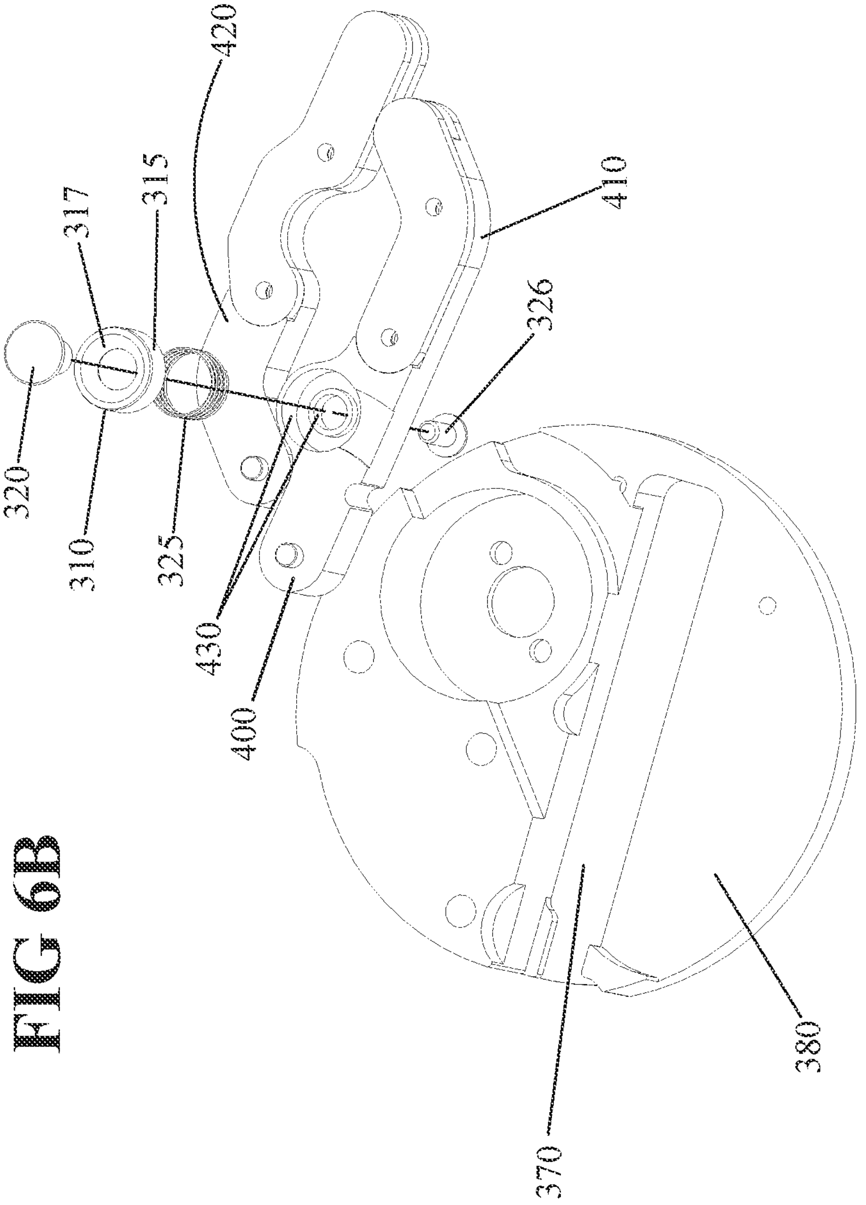
FIG. 6B shows an exploded perspective view of the release button, arm and lower body plate with other items removed.
Figure 6C:
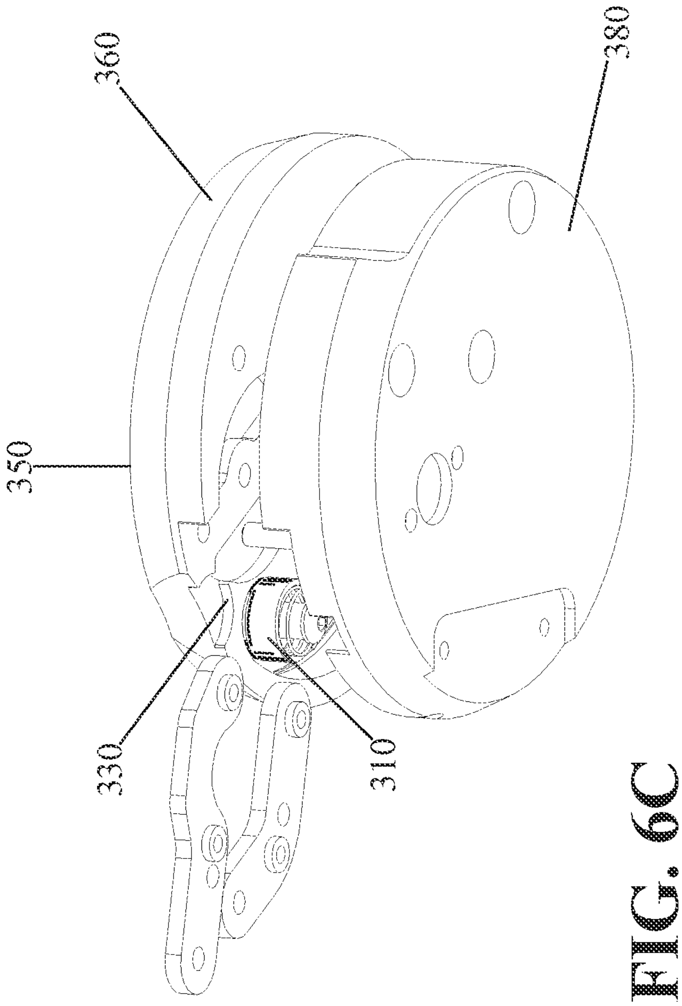
FIG. 6C shows an exploded perspective view of the release button, upper body plate, lower body plate and stop.

FIG. 6A shows and an upper link cap 415 and lower link cap 425. The link caps allow users to easily change blades by removing screws and not having to press out pins. For example, a user may want to install a dull practice blade for training and later replace it with a sharp blade for use in operation.

As most clearly shown in FIG. 3, the blade 550 has a hook shaped form with a sharp interior edge 560 and dull exterior edge 570. When formed in this manner the hook shaped blade form emulates a cat's claw to provide aggressive penetration desired for a defensive, pull-oriented cutting motion. The present disclosure recognizes that a pulling motion is instinctual in close contact self-defense situations, particularly when an attacker approaches from behind the user and places their arm across the user's neck, chest or waist. While a user can apply a pulling motion with a conventional straight blade, straight blades ride out of the cutting surface, while the curved blade with its extreme point digs in.

As shown in FIGS. 7B, and 8-10, at least a portion of the blade's exterior edge 570 can be formed with a curve that substantially matches the curve of the body 300, such that when the blade 550 is folded into its retracted position, at least a portion of the blade's exterior edge 570 substantially matches the circular perimeter of the body 300 to provide a form factor similar to that of a wristwatch. When retracted, the curved shape of the blade 550 also allows for other components or structure to be disposed in the area immediately adjacent to the curve of the sharp interior edge 560, as shown in FIGS. 9-10.

FIGS. 8-9 show the knife 200 and all components in their retracted positions and the trigger 140 in its engaged position. This arrangement enables the knife to rest securely within the holder 100 in a seated position with the launch shoulder 120 received between the wings of the foot 220. In this position, the trigger groove 170 engages a substantially flat catch plate 240 fixed to the body, which provides a detent fit that prevents the ledge from pivoting and keeps the knife retained in its seated position, with the handle 205 and foot 220 substantially collapsed into the body 300 in their retracted positions. When the knife 200 is in its retracted position, the foot 220, handle 205, arm 400 and blade 550 each substantially retract into the body 300, such that each of these components are at least substantially disposed within the perimeter of the body, with no more than portions of these components extending beyond that perimeter.

FIG. 7C shows the release button 310 when the knife is retracted. The release button 310 rests in its raised position above the upper surface of the handle 205 and inside bore 430 formed near the center of the upper body plate 360. When in its retracted position, the handle 205 prevents axial/downward movement of the trigger plate 350 and release button 310 toward their lowered positions. Specifically, button head screw 326 contacts the upper surface of the handle 205, thereby preventing downward movement of the cap 320 fastened to button head screw 326. This arrangement acts as a safety measure to prevent unintended depression of the trigger plate, 350 and lowering of the release button 310, which would, in-turn, unintentionally extend and expose the blade 550 in the manner discussed below.

Providing a release button 310 with a separate collar 315 and cap 320, rather than a one-piece release button, advantageously allows the collar 315 to carry a shear load applied by the upper link 410 (originating from the drum spring 505 discussed further below) when the upper link 410 is in its retracted position. This shear load may, under certain circumstances, impede movement by the collar 315 within bore 430. Providing a release button with a separate collar 315 and cap 320, with the collar carrying the shear load, reduces the risk of similarly impeding movement by the cap and button head screw, which could otherwise translate to undesired consequences, such as impeding movement by the handle 205 under certain operational conditions.

The user unseats the knife by flipping the top of the trigger 140, thereby causing the trigger to pivot and trigger grove 170 to disengage from the catch plate 240. Disengaging the trigger allows the foot 220 to pivot toward its extended position, as urged by the foot spring 223 and the handle spring 217 to propel the knife outward relative to the launch wall 117. As the knife launches, the tether 190 acts to keep the knife 200 attached to the holder and accessible to the user. In an alternative embodiment, the holder itself may be equipped with a resilient member disposed proximate to the launch wall 117 or the like. Under this alternative embodiment components of the holder cause the knife 200 to propel outward.

The user may grip the knife 200 with the foot 220 and handle 205 extended and while the blade 550 is still retracted. FIG. 3 shows that the foot 220, handle 205 and body 300 form an arched shape, which provides a natural gripping contour. The curvature of the foot 205 invites contact with a pinky finger and gives an immediate indication that the knife 200 is being held in a preferred orientation such that the blade's tip (point D in FIG. 3) will be substantially oriented away from the user's hand when the blade 550 reaches its extended position. This preferred orientation enables an effective downward or sideways slashing/cutting motion. If gripped in the opposite direction, however, the user can still cause the blade 550 to extend (in the manner described below) and the blade 550 can still provide an effective defense using a pulling motion during use.

When in its extended position, the handle 205 is no longer disposed below the release button. This arrangement allows the user to depress the trigger plate 350 and cause axial movement of the release button 310 toward its lowered position. As the release button 310 continues to move toward its lowered position, it ultimately exits the bore 430 thereby allowing the drum spring 505 to urge the arm 400 and blade 550 toward the extended position shown in FIGS. 2-3. As the arm moves toward its extended position, the release button 310 (seated within the upper arm bore 430 of the upper link 410) travels with the upper link 410 until it reaches the lockout notch 330 (shown in FIG. 6C). At this point, the coil spring urges the release button 310 toward its raised position where it rests against the lockout notch 330, thereby locking the arm 400 and blade 550 in their extended positions and preventing any unintentional pivoting of the arm linkages or corresponding retraction of the blade.

When extended and locked, the knife 200 is grasped by the fingers and thumb in a manner similar to a traditional knife. The proportions, angles and shapes shown in the figures (which are substantially drawn to scale) enable the knife 200, confined to a wristwatch-like form factor in its retracted position, to expand to approximately 3.5 times its retracted length in its extended position when accounting for the foot, handle, body, arm and blade. In the exemplary embodiment shown in FIG. 3, the full length of the knife extends for 13.5 cm between reference points A and D providing sufficient leverage for effective use. A graspable portion that includes the foot, handle, and body extends for 7.9 cm between reference points A and B in FIG. 3. The graspable portion may also include the arm, thereby extending the available graspable portion to 10 cm between reference points A and C in FIG. 3

The user depresses the release button 310 to fold the blade 550 and arm 400 back into their retracted positions. When the release button 310 is fully depressed, it ultimately clears the lower edge of the lockout notch 330. This allows the arm 400 and release button 310 to pivot until the release button reaches the release bore 365, where the release button snaps toward its raised position inside the release bore 365, as urged by the button spring 325. This locks the blade 550 in the retracted position.

To return the knife 200 to the seated position within the holder 100, the user guides the foot 220 toward the launch shoulder 120 allowing the shoulder to be received between the wings of the foot 225A, B when in its retracted position. Pressing the foot 220 and distal end of the handle against the launch wall 117 causes the handle 205 and foot 220 to collapse into their retracted positions. With the blade, arm, handle and foot in their retracted positions, this allows the user to pivot the trigger toward its engaged position such that the knife is fully seated within the holder, as shown in FIGS. 8-9.

In exemplary embodiments, unless otherwise specified, the components of the present invention may be constructed of stainless steel or other durable material common to traditional pocket knives.

Figure 11A:
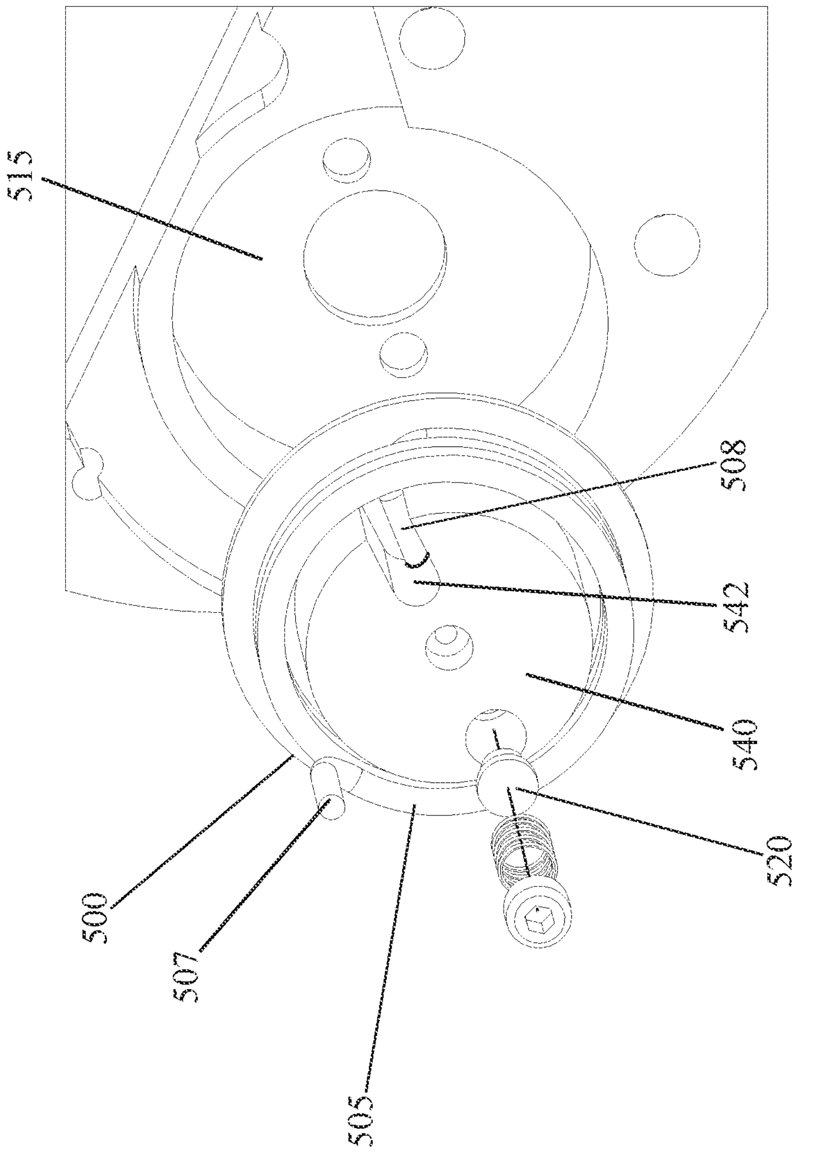
FIG. 11A shows an enlarged perspective view of the drum assembly.
Figure 11B:
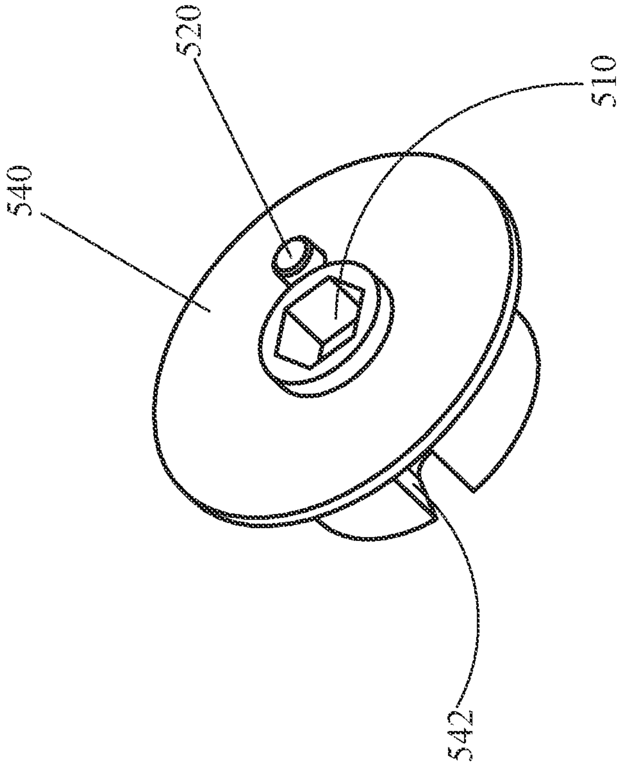
FIG. 11B shows a bottom view of the drum assembly.

FIGS. 11A, 11B show an embodiment that includes a drum assembly 500 seated within a pocket 515. The drum assembly 500 includes a winding socket 510, drum pin 520, drum spring 505 and rotatable drum 540. A protrusion or turn 507 at the first end of the drum spring engages an indentation 412 in the upper link 410. A second protrusion or turn 508 at the other end of the drum spring 505 engages an indentation 542 in the perimeter of the rotatable drum 540. The drum spring 505 may be tensioned/wound (or conversely unwound) by inserting a hexagon wrench or the like into the winding socket 510 and causing the drum 540 and second protrusion 508 to rotate. When tensioned, the drum pin 520 (which is urged outward by a spring) snaps into an aperture to prevent the drum 540 from rotating more. If tensioned, the drum spring 505 can cause the arm 400 and blade 550 to instantly snap into their extended positions using the trigger plate 350 and release button 310 in the manner described above. If the drum spring 505 is unwound, the arm 400 and blade 550 extend manually.

The wearable self-defense device of the present application allows users to quickly arm through two actions that can occur in less than a second: (1) actuating the trigger 140 to instantly launch the knife 200 and spring the foot and handle toward their extended positions, and consequently propel the device into the user's hand; and (2) applying any form of pressure to the trigger plate 350, including simply grasping the body 300, to instantly spring and lock the arm 400 and blade 550 into their extended positions. Once in its extended position, the knife 200 provides a rigid, durable and effective self-defense apparatus capable of inflicting substantial damage on an attacker and greatly increasing a user's chance of escape.

Figure 12:
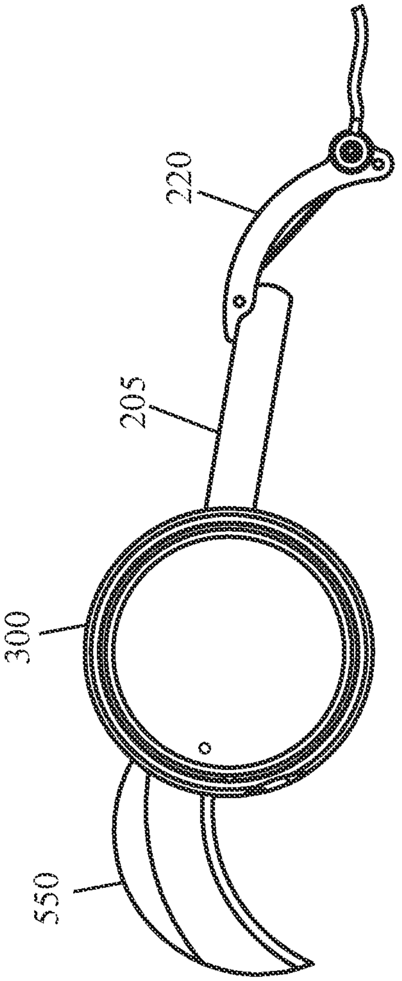
FIGS. 12-14 show alternative embodiments of the knife of the present invention.
Figure 13:
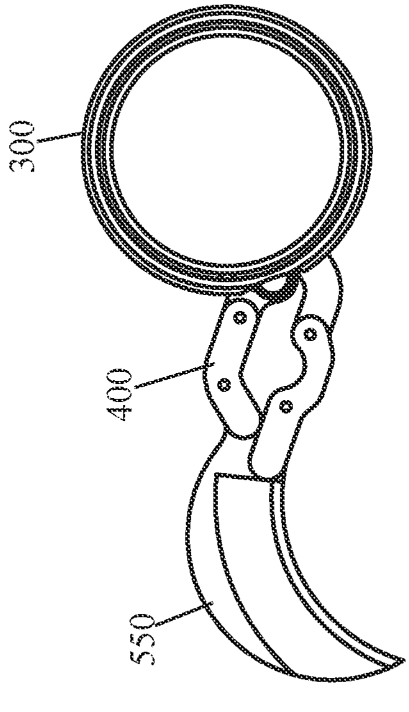
Figure 14:
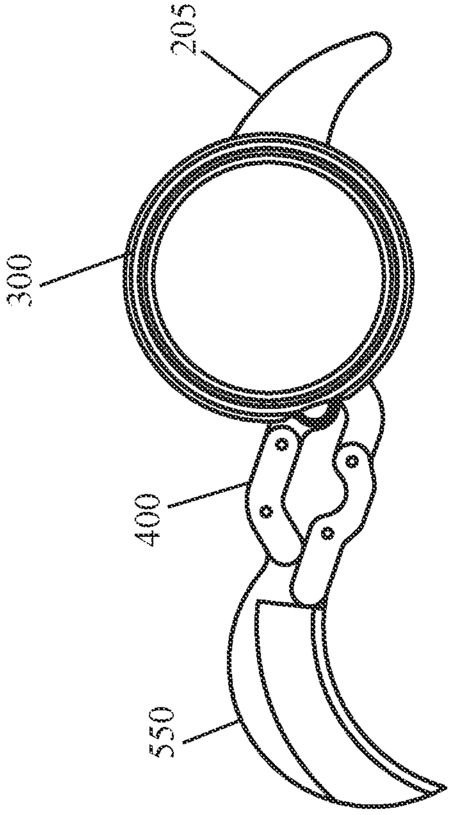

It will be appreciated that alternative embodiments may also include a knife consisting of a blade 550, body 300, handle 205 and foot 220 as shown in FIG. 12. FIG. 13 shows another alternative embodiment of the knife consisting of a blade 550, arm 400 and body 300. FIG. 14 shows another alternative embodiment of the knife consisting of a blade 550, arm 400, body 300, with a handle 205 that is substantially fixed to the body. In a variation of the embodiment of FIG. 14, the handle 205 may be permitted to move between extended and retracted positions, where the handle acts to prevent extension of the arm and blade in the manner similar to the embodiment of FIG. 2.

While the present disclosure has been described with reference to one or more particular embodiments or implementations, those skilled in the art will recognize that many changes may be made thereto without departing from the spirit and scope of the present disclosure. Each of these implementations and obvious variations thereof is contemplated as falling within the spirit and scope of the present disclosure. It is also contemplated that additional implementations according to aspects of the present disclosure may combine any number of features from any of the implementations described herein.

What is claimed is:

1. A self-defense device comprising:

a wearable holder;

a knife detachably coupled to the wearable holder and moveable relative to the wearable holder between attached and detached positions;

the knife comprising a handle, body, arm and blade, wherein the handle is coupled to the body and the arm is coupled to the body and blade;

the handle, arm and blade are each configured to move relative to the body between retracted and extended positions;

the body has a substantially round perimeter and the blade has a substantially curved outer edge matching the curve of the body's perimeter;

wherein the handle, arm and blade each substantially retract into the body's perimeter when in their retracted positions.

2. The self-defense device of claim 1, wherein first, second and third resilient members each respectively bias the blade, arm and handle toward their extended positions.

3. The self-defense device of claim 2 further comprising a foot pivotably connected to a distal end of the handle and configured to pivot relative to the arm between retracted and extended positions; the foot has a substantially curved profile matching the curve of the body's perimeter, wherein the foot substantially retracts into the body's perimeter when in its retracted position; and a fourth resilient member biasing the foot toward its extended position.

4. The self-defense device of claim 3 wherein the arm comprises a 4-bar linkage comprising (i) opposing first and second linkage elements configured to pivot between extended and retracted positions and (ii) opposing third and fourth linkage elements respectively formed from opposing portions of the blade and body, wherein the first and second linkage elements substantially retract into the body's perimeter when in their retracted positions.

5. The self-defense device of claim 4, wherein the first linkage element comprises (i) a release button movable relative to a surface of the first linkage element between raised and lowered positions, and (ii) a fifth resilient member that biases the release button toward its raised position, wherein when the release button is in its raised position, it prevents the arm from moving toward its extended position.

6. The self-defense device of claim 5, further comprising a depressible trigger plate movable relative to the body between raised and lowered positions, wherein when the depressible trigger plate is moved toward its lower position it causes the release button to move toward its lowered position.

7. The self-defense device of claim 6, wherein the body further comprises an elongated channel disposed beneath the trigger plate and adapted to slideably receive the handle; (i) wherein when the handle is in its retracted position, the handle prevents the trigger plate from moving toward its lowered position, and (ii) wherein when the handle is in its extended position it permits the trigger plate to move towards its lowered position.

8. The self-defense device of claim 3, wherein the wearable holder comprises a trigger pivotable between engaged and disengaged positions, (i) wherein pivoting the trigger to its engaged position causes the trigger to engage a surface of the knife and maintain the knife in its attached position, and (ii) wherein pivoting the trigger to its disengaged position permits the knife to move to its detached position.

9. The self-defense device of claim 8, wherein disengaging the trigger allows the handle to extend and the foot to pivot toward its extended position while in contact with a surface of the holder, thereby causing the knife to propel outward.

10. The self-defense device of claim 1 further comprising a flexible tether with one end fixed to the wearable holder and other end fixed to the knife.

11. The self-defense device of claim 10 wherein the wearable holder comprises a wrist strap.

12. A self-defense device comprising:

a knife comprising a handle, body, arm and blade, wherein the handle is coupled to the body and the arm is coupled to the body and blade;

the handle, arm and blade are each configured to move relative to the body between retracted and extended positions;

the body has a substantially round perimeter and the blade has a substantially curved outer edge matching the curve of the body's perimeter, wherein the handle, arm and blade each substantially retract into the body's perimeter when in their retracted positions;

a foot pivotably connected to a distal end of the handle and configured to pivot relative to the arm between retracted and extended positions, wherein the foot has a substantially curved profile matching the curve of the body's perimeter, wherein the foot substantially retracts into the body's perimeter when in its retracted position; and first, second, third and fourth resilient members each respectively biasing the blade, arm, handle and foot toward their extended positions.

13. The self-defense device of claim 12 wherein the arm comprises a 4-bar linkage comprising (i) opposing first and second linkage elements configured to pivot between extended and retracted positions and (ii) opposing third and fourth linkage elements respectively formed from opposing portions of the blade and body, wherein the first and second linkage elements substantially retract into the body's perimeter when in their retracted positions.

14. The self-defense device of claim 13, wherein the first linkage element includes (i) a release button movable relative to a surface of the first linkage element between raised and lowered positions, and (ii) a fifth resilient member that biases the release button toward its raised position, wherein when the release button is in its raised position, it prevents the arm from moving toward its extended position.

15. The self-defense device of claim 14, further comprising a depressible trigger plate movable relative to the body between raised and lowered positions, wherein when the depressible trigger plate is moved toward its lower position it causes the release button to move toward its lowered position.

16. The self-defense device of claim 15, wherein the release button is disposed proximate to a protrusion formed on the first linkage element, and the second linkage comprises a depression, wherein when the first and second linkages are in their retracted positions the protrusion is substantially disposed within the depression.

17. The self-defense device of claim 13 further comprising a drum and drum spring adapted to wind between wound and unwound conditions and biased toward the unwound condition;

a first end of the drum spring engages a surface of the first linkage element and a second end of the drum spring engages a surface of the drum;

the drum rotates between (i) a first position where the drum spring is unwound and (ii) a second position where the drum spring is wound;

wherein the drum spring biases the first linkage element toward its extended position only when the drum is in the second position.

18. A self-defense device comprising:

a knife comprising a handle, body, arm and blade, wherein the handle is coupled to the body and the arm is coupled to the body and blade;

the handle, arm and blade are each configured to move relative to the body between retracted and extended positions; wherein the handle, arm and blade each substantially retract into the body's perimeter when in their retracted positions; and a foot pivotably connected to a distal end of the handle and configured to pivot relative to the arm between retracted and extended positions, wherein the foot has a substantially curved profile matching the curve of the body's perimeter, wherein the foot substantially retracts into the body's perimeter when in its retracted position.

19. The self-defense device of claim 18 wherein the arm comprises a 4-bar linkage comprising (i) opposing first and second linkage elements configured to pivot between extended and retracted positions and (ii) opposing third and fourth linkage elements respectively formed from opposing portions of the blade and body, wherein the first and second linkage elements substantially retract into the body's perimeter when in their retracted positions.

20. The self-defense device of claim 19 wherein the body, arm, blade and foot collectively form a substantially circular form factor when in their respective retracted positions.

* * * * *